Patented Jan. 4, 1949

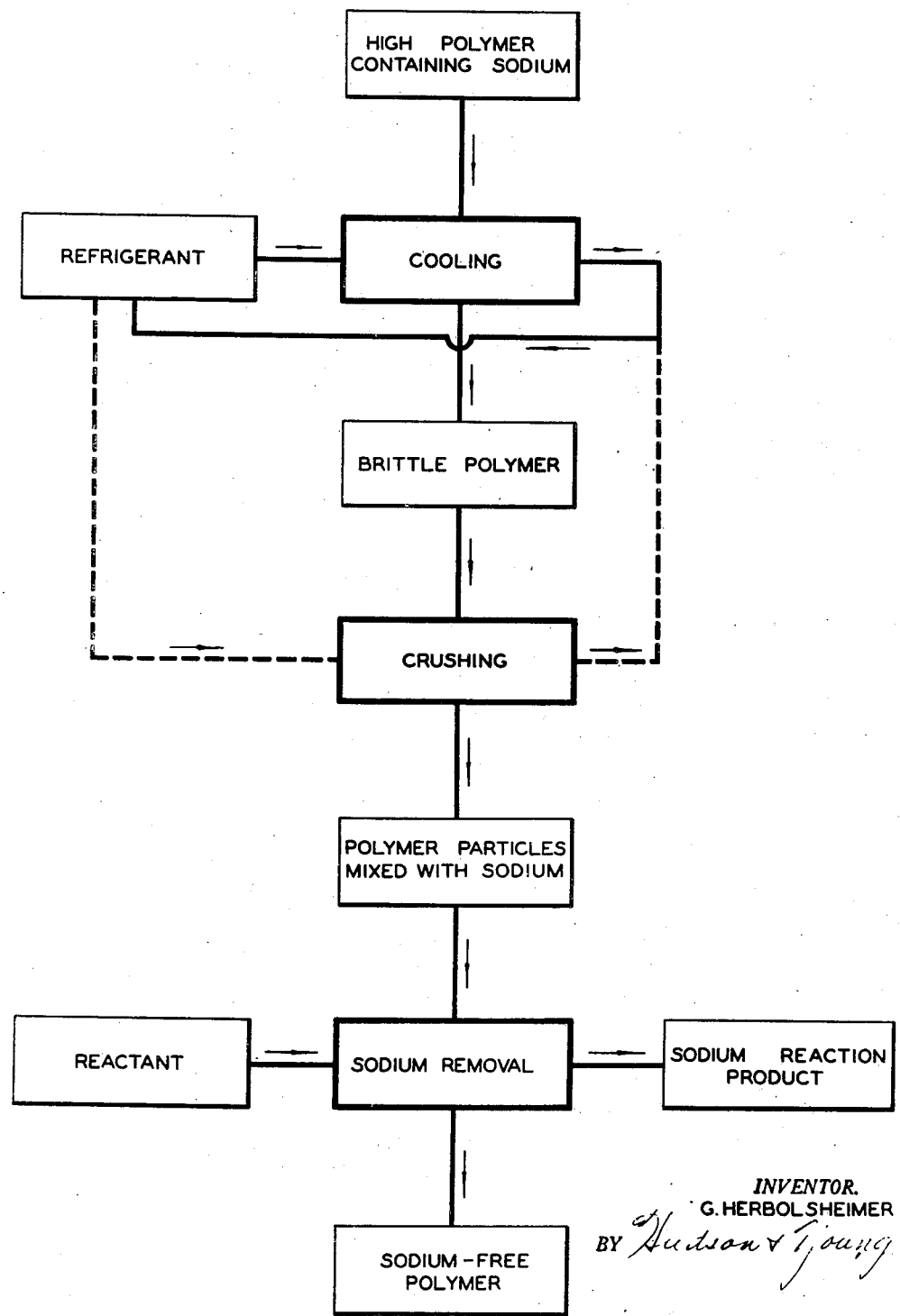

2,458,378

UNITED STATES PATENT OFFICE 2,458,378

PROCESS OF SEPARATING METALLIC SODIUM FROM HIGH MOLECULAR WEIGHT POLYMERS MADE BY POLYMERIZATION OF VINYL COMPOUNDS

Glenn Herbolsheimer, Bartlesville, Okla., assignor to Phillips Petroleum Company, a corporation of Delaware Application January 7, 1946, Serial No. 639,668

11 Claims. (Cl. 260—86.5)

This invention relates to a process for the production of high polymers of the type known as synthetic rubber. In one of its more specific aspects it relates to the separation of solid particles from synthetic rubber.

It is well known that butadiene hydrocarbons and other polymerizable unsaturated organic compounds containing a methylene group attached by an olefinic double bond to a carbon atom in the structure $CH_2=C<$ may be polymerized using an alkali metal as a catalyst. Metallic sodium in the form of small discrete particles is particularly effective as a catalyst for these reactions. The monomeric polymerizable unsaturated organic compounds may be polymerized to form high molecular weight polymers either individually or in admixture with one another. The use of a mixture of comonomers results in the production of copolymers, many of which are important as synthetic rubbers. Compounds which contain the $CH_2=C<$ group and which are suitable as monomers (or comonomers) for the production of high polymers include the following: aliphatic conjugated diolefins, 1,3-butadiene, its homologs and analogues which polymerize in the same manner, e. g., isoprene, dimethylbutadiene-1,3, piperylene, chloroprene, etc.; aryl olefins, e. g., styrene; nitriles of acrylic and methacrylic acids, e. g., acrylonitrile, methacrylonitrile; and esters of acrylic and methacrylic acids, e. g., methyl acrylate, and methyl methacrylate. These unsaturated compounds are given by way of example only and not as limitations to the present invention.

At the present time there is considerable interest in the mass polymerization of the vinyl compounds (compounds containing the $CH_2=C<$ group) to produce synthetic rubbers. Mass polymerization of vinyl compounds, polymerization without dispersion in an aqueous medium, may be used to produce polymers and copolymers which are especially valuable for certain uses. An advantage of this method of polymerization arises from the fact that it is not necessary to prepare an emulsion of monomers or to separate the polymer from the water and emulsifying agents.

As carried out in a preferred manner, the monomeric material (one or more monomers) is charged to an autoclave provided with means for agitating the monomer and for controlling the pressure and reaction temperature during the conversion period. Finely divided metallic sodium is added to the monomeric material and dispersed therein by agitation. As the polymerization proceeds the polymer forms a film over the finely divided metallic sodium catalyst. When the reaction is complete, there is obtained a more or less solid mass which contains all of the sodium originally charged greatly dispersed throughout the polymeric product. It is thus seen that this particular method of polymerization has the serious disadvantage of retaining the catalyst in the product polymer.

It is necessary to remove this metallic sodium prior to any further processing of the polymer. Numerous methods for this removal have been suggested but for one reason or another are unsatisfactory. For instance, the rubber-like material may be dissolved in a benzene-methyl alcohol mixture. As the polymer goes into solution, the particles of sodium are exposed and react with the methyl alcohol which is present to form the soluble sodium methylate. After the polymer is completely dissolved, an additional quantity of methyl alcohol is added to the solution. This causes a reprecipitation of the polymer which may then be separated from the solution containing the sodium methylate.

While this method serves to remove the undesirable metallic sodium, it is unsatisfactory since the properties of the reprecipitated polymer are entirely different from the original. Other suggestions involve working the polymer at atmospheric temperature which causes excessive heating and undesirable reduction in molecular weight. For example, grinding the crude polymer causes it to become soft and tacky.

By the present invention, a polymer containing dispersed particles of metallic sodium is cooled by refrigeration to a temperature at which it becomes frangible. It is then reduced to a finely divided form which exposes the particles of metallic sodium catalyst. The metallic sodium is then reacted with a suitable reactant, for example, water or a low molecular weight alcohol, and the reaction product separated from the polymer. The polymer is obtained in substantially pure form, free from the sodium catalyst.

An object of this invention is to provide an improved process for the manufacture of a high polymer. Another object is to provide an improved method of separating solid particles from polymer. Still another object is to provide an improved method for the separation of metallic sodium from a high polymer.

In accordance with one embodiment of my invention, a high polymer containing dispersed particles of metallic sodium is cooled by contact with refrigerated alcohol to a temperature at which the polymer is frangible. The polymer becomes quite brittle and is reduced to a finely divided powder by crushing, as with rollers, hammer mill, or ball mill, in the presence of the refrigerated alcohol. As the encased metallic sodium is exposed by the crushing or grinding operation, it reacts with the alcohol to form a sodium alcoholate. The sodium alcoholate is dissolved by the alcohol and is readily separated from the polymer in any convenient manner. A filter press such as the Oliver-type, for example, may be employed for the solid-liquid separation. The polymer is obtained as a product substantially free from sodium.

Alcohols which are suitable for use in the process of my invention are the normal and iso alcohols containing from 1 to 5 carbon atoms per molecule. The preferred alcohols are methanol, ethanol, propanol, isopropanol, n-butanol, and isobutanol.

In carrying out this method the alcohol is reduced to a low temperature by indirect heat exchange with a suitable refrigerant, e. g., carbon dioxide, ethane, propane, ammonia, dichlorodifluoromethane (Freon 12), methyl chloride, or the like. The alcohol is cooled to a temperature somewhat below the temperature at which the polymer becomes hard and brittle. Refrigerated alcohol is circulated through the polymer cooling zone in direct contact with the polymer. Sufficient refrigerated alcohol is circulated to remove the specific heat of the polymer, the heat of reaction, and the heat of crushing or grinding. Any sodium alcoholate retained on the polymer may be separated therefrom by washing the polymer with additional alcohol or with water.

The temperature to which the polymer is cooled depends upon the physical properties of the polymer. It is necessary to cool the polymer to a temperature at or below that at which it becomes frangible. This temperature is best determined experimentally for each polymer. A temperature within the range of $-70°$ F. to $-80°$ F. has been found suitable for butadiene-styrene high polymers. The cooling of the polymer may be accomplished in any conventional manner; direct contact of the polymer with a refrigerant which is inert to the polymer is preferred.

A preferred specific embodiment of the process of my invention is illustrated in the accompanying drawing. In accordance with this method, the high polymer containing dispersed particles of metallic sodium is cooled with a suitable refrigerant which is inert to the polymer to a temperature at which the polymer is brittle and frangible. This is preferably accomplished by direct contact of the polymer with the refrigerant. Among the refrigerants which may be satisfactorily employed are carbon dioxide, ethane, propane, propylene, dichlorodifluoromethane and methyl chloride. The brittle polymer is then reduced to a pulverant state by crushing or grinding. A preferred method of size reduction is crushing of the polymer by means of one or more pairs of cooperating rollers. This operation exposes the individual particles of metallic sodium contained in the polymer. The disintegrated polymer admixed with particles of metallic sodium is then contacted with a sodium reactant, e. g., water or methyl alcohol, which reacts with the sodium to form a reaction product soluble in the reactant. The sodium reaction product dissolved in the unreacted sodium reactant is separated from the polymer. The separation may be effected satisfactorily by filtration. The polymer may be washed, if desired, to insure complete removal of the sodium reaction product. A sodium-free polymer is obtained by this method of operation which after drying may be compressed into bales for shipping. It has been found advantageous in carrying out this method to employ propane as the refrigerant and to use water to effect the sodium removal. The crushing or grinding may be carried out either in the presence or absence of the refrigerant. Preferably, the refrigerant is present during the crushing operation to refrigerate the apparatus and insure brittleness of the polymer necessary for effective pulverizing. The disintegrated polymer may be allowed to warm up prior to the addition of the sodium reactant. In addition to water and methyl alcohol, other sodium reactants may be employed, particularly the normal and iso alcohols containing from 1 to 5 carbon atoms per molecule.

Unexpectedly, neither the subcooling of the polymer nor the crushing at low temperature alters the desirable physical properties to any appreciable extent. Upon warming the polymer to atmospheric temperature the viscosity, molecular weight, and other physical properties are found to be substantially unchanged. The novel method for sodium removal from high polymers described herein, makes feasible the use of metallic sodium as a catalyst for mass polymerization of polymerizable unsaturated compounds on a commercial scale.

*Example*

A copolymer of 1,3-butadiene and styrene was made by charging 75 parts by weight butadiene and 25 parts styrene to a closed autoclave provided with an agitator. 0.35 part of finely divided metallic sodium was added to the autoclave and dispersed in the monomers by agitation. The polymerization was carried out at a temperature of 122° F. (50° C.) for a period of 12 hours at which time polymerization was substantially complete. The polymer was discharged from the autoclave and cooled to a temperature of $-70°$ F. by direct contact with refrigerated methyl alcohol. At this temperature the polymer became very hard and brittle and developed a myriad of small cracks. The polymer was crushed mechanically in the presence of the methyl alcohol, thereby exposing the particles of metallic sodium which immediately reacted with the alcohol. The polymer was separated from the alcohol and dried. It was found to be substantially free from metallic sodium and to possess the physical properties of the original polymer.

The foregoing specific example is given by way of illustration only and is not to be considered as in any way limiting my invention. Various modifications are within the scope of my invention and may be employed in carrying out the process without departing from the spirit of the invention.

I claim:

1. A process for the separation of metallic sodium from a high molecular weight organic polymer resulting from the mass polymerization of a vinyl compound with metallic sodium which comprises cooling said polymer containing metallic sodium to a temperature at which the polymer is frangible, disintegrating said polymer while it is at said temperature and thereby exposing the individual particles of metallic sodium contained in the polymer, and reacting the resulting disintegrated mass of sodium and polymer with a sodium reactant selected from the group consisting of water and normal and iso alcohols containing from 1 to 5 carbon atoms per molecule, and separating the sodium reaction product from said polymer.

2. A process for the separation of finely divided metallic sodium from a high molecular weight polymer resulting from the mass polymerization of a vinyl compound with metallic sodium which comprises cooling said polymer containing metallic sodium to a temperature at which the polymer is frangible by direct contact with a refrigerant inert to the polymer, disintegrating the frangible polymer while it is at said temperature and thereby exposing the individual particles of metallic sodium contained in the polymer, reacting the resulting disintegrated mass with a sodium reactant selected from the group consisting of water and normal and iso alcohols containing from 1 to 5 carbon atoms per molecule, and separating the resulting sodium reaction product from the polymer.

3. A process as defined in claim 2 wherein the refrigerant is propane and the sodium reactant is water.

4. A process for the separation of finely divided metallic sodium from a high molecular weight polymer resulting from the mass polymerization of a vinyl compound with metallic sodium which comprises cooling said polymer containing metallic sodium to a temperature not above about −70° F. by direct contact with liquid propane, disintegrating the polymer at a temperature not above about −70° F., reacting the resulting disintegrated mass with a sodium reactant selected from the group consisting of water and normal and iso alcohols containing from 1 to 5 carbon atoms per molecule, and separating the resulting sodium reaction product from the polymer.

5. A process as defined in claim 4 wherein said sodium reactant is water.

6. A process as defined in claim 4 wherein said sodium reactant is methyl alcohol.

7. A process as defined in claim 4 wherein said sodium reactant is isopropyl alcohol.

8. A process for the separation of finely divided metallic sodium from a high molecular weight polymer resulting from the mass polymerization of a vinyl compound with metallic sodium which comprises cooling said polymer containing metallic sodium to a temperature at which the polymer is frangible by direct contact with refrigerated liquid alcohol containing from 1 to 5 carbon atoms per molecule, disintegrating the frangible polymer while it is at said temperature in the presence of said alcohol as a sodium reactant and thereby exposing the metallic sodium contained in said polymer and effecting reaction thereof with said alcohol, and separating the resulting sodium alcoholate from the polymer.

9. A process as defined in claim 8 wherein said alcohol is methyl alcohol.

10. A process for the separation of metallic sodium from a copolymer of 1,3-butadiene and styrene resulting from the mass polymerization of a mixture of 1,3-butadiene and styrene with metallic sodium which comprises cooling said copolymer containing sodium to a temperature not above about −70° F., disintegrating the polymer at said reduced temperature and thereby exposing the individual particles of metallic sodium contained in said polymer, reacting the resulting disintegrated mass with methyl alcohol, and separating the resulting sodium methylate from the copolymer.

11. A process for the separation of finely divided metallic sodium from a high molecular weight copolymer of 1,3-butadiene and styrene resulting from the mass polymerization of a mixture of 1,3-butadiene and styrene with metallic sodium which comprises cooling said polymer containing metallic sodium to a temperature of −70° F. by direct contact with refrigerated methyl alcohol, crushing said polymer mechanically in the presence of said refrigerated methyl alcohol and thereby exposing the metallic sodium and effecting immediate reaction thereof with said alcohol, and separating from the alcohol the polymer substantially free from metallic sodium and possessing the physical properties of the original polymer.

GLENN HERBOLSHEIMER.

REFERENCES CITED

The following references are of record in the file of this patent:

UNITED STATES PATENTS

| Number | Name | Date |
|---|---|---|
| 1,058,056 | Harries | Apr. 8, 1913 |
| 2,347,464 | Cuno | Apr. 25, 1944 |